United States Patent [19]

Glickman

[11] Patent Number: 5,199,919
[45] Date of Patent: Apr. 6, 1993

[54] CONSTRUCTION TOY SYSTEM

[75] Inventor: Joel I. Glickman, Huntingdon Valley, Pa.

[73] Assignee: Connector Set Limited Partnership, Hatfield, Pa.

[21] Appl. No.: 717,639

[22] Filed: Jun. 19, 1991

Related U.S. Application Data

[63] Continuation-in-part of Ser. No. 687,306, Apr. 18, 1991, Pat. No. 5,137,486, and a continuation-in-part of Ser. No. 625,809, Dec. 11, 1990, Pat. No. 5,061,219.

[51] Int. Cl.[5] .......................................... A63H 33/04
[52] U.S. Cl. .................................... 446/126; 446/124; 446/120
[58] Field of Search ............... 446/85, 105, 107, 120, 446/124, 126

[56] References Cited

U.S. PATENT DOCUMENTS

| | | |
|---|---|---|
| 289,573 | 3/1961 | Fentiman . |
| 1,113,371 | 10/1914 | Pajeau ........................ 446/126 |
| 1,608,592 | 11/1926 | Funk . |
| 1,707,691 | 4/1929 | Sweet ........................ 446/126 |
| 1,843,115 | 2/1932 | Ferris ........................ 446/126 |
| 1,898,297 | 2/1933 | Fox . |
| 2,633,662 | 4/1953 | Nelson . |
| 2,683,329 | 7/1954 | Kobler . |
| 2,709,318 | 5/1955 | Benjamin .................. 446/126 |
| 2,800,743 | 7/1957 | Meehan et al. . |
| 2,902,821 | 9/1959 | Kelly, Jr. .................... 446/126 |
| 2,976,968 | 3/1961 | Fentiman . |
| 3,275,351 | 9/1966 | Fentiman . |
| 3,286,391 | 11/1966 | Mengeringhausen ....... 446/126 |
| 3,564,758 | 2/1971 | Willis . |
| 3,626,632 | 12/1971 | Bullock, Jr. . |
| 3,648,404 | 3/1972 | Ogsbury et al. ............ 496/126 |
| 3,891,335 | 6/1975 | Feil . |
| 4,078,328 | 3/1978 | Rayment .................... 446/126 |
| 4,302,900 | 12/1981 | Rayner ...................... 446/120 |
| 4,758,196 | 6/1988 | Wang . |
| 4,988,322 | 1/1991 | Knudsen .................... 446/120 |
| 5,049,105 | 9/1991 | Glickman .................. 446/126 |

FOREIGN PATENT DOCUMENTS 366230 1/1963 Switzerland .
2058590 4/1981 United Kingdom .

Primary Examiner—Robert A. Hafer
Assistant Examiner—Sam Rimell
Attorney, Agent, or Firm—Schweitzer Cornman & Gross

[57] ABSTRACT

A construction toy system comprises a variety of molded plastic connector elements, arranged to be joined with rod-like struts, to form complex structural units. In the most basic form, the connector elements of the invention have one or more angularly related strut-receiving recesses, each arranged for lateral snap-in reception of a flanged strut. When a strut is snapped in place, it is held firmly against lateral and axial movement. A plurality of single socket connector elements can be connected with a succession of crosswise oriented strut elements to form an articulated structure, either endless or finite in length. Connector elements also may be joined to form connector assemblies with provision for mounting struts in several planar directions, to form a right angle corner structure, for example, or a Tee-shaped structure. To advantage, the construction toy set includes strut elements in graduated sizes according to a predetermined length progression, such that one standard size can serve as the hypotenuse of a right isosceles triangle formed with struts of a smaller size. This enables complex structures to be assembled using right triangular subunits. The struts may be assembled into and/or removed from structures of a substantially rigid character, because of the ability to effect lateral snap-in insertion of the struts. Also disclosed is a simple Device for joining a strut and a connecting element for rotation in unison.

29 Claims, 10 Drawing Sheets

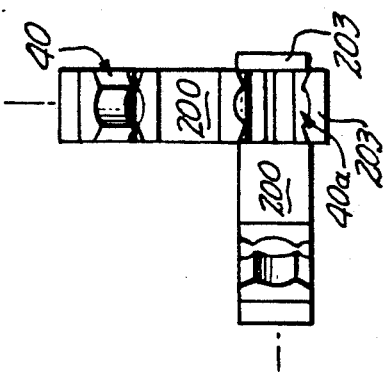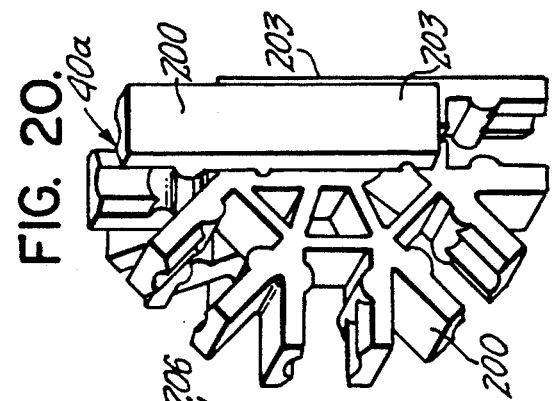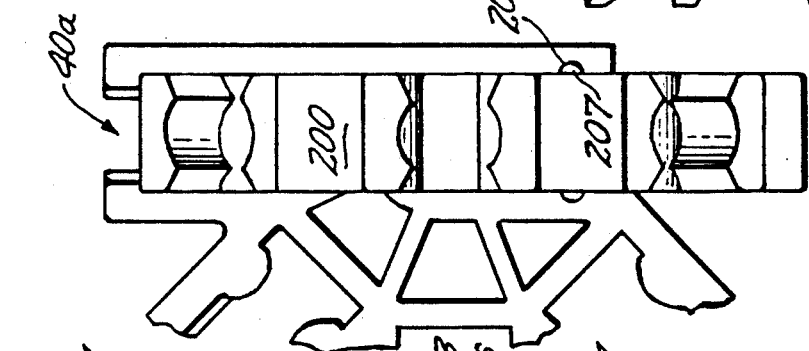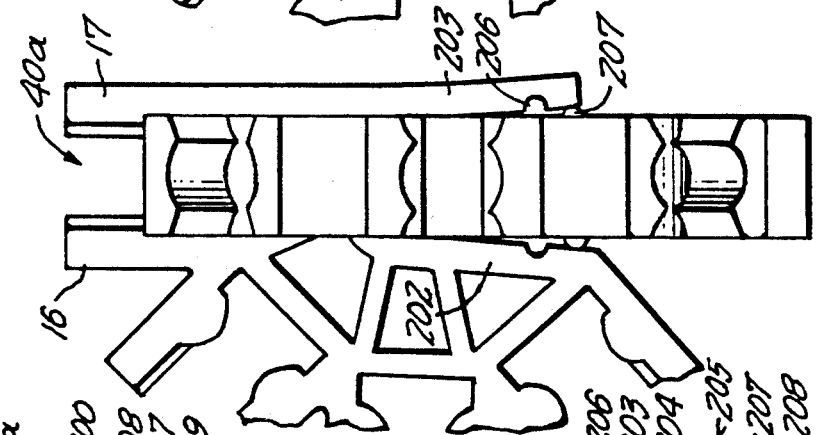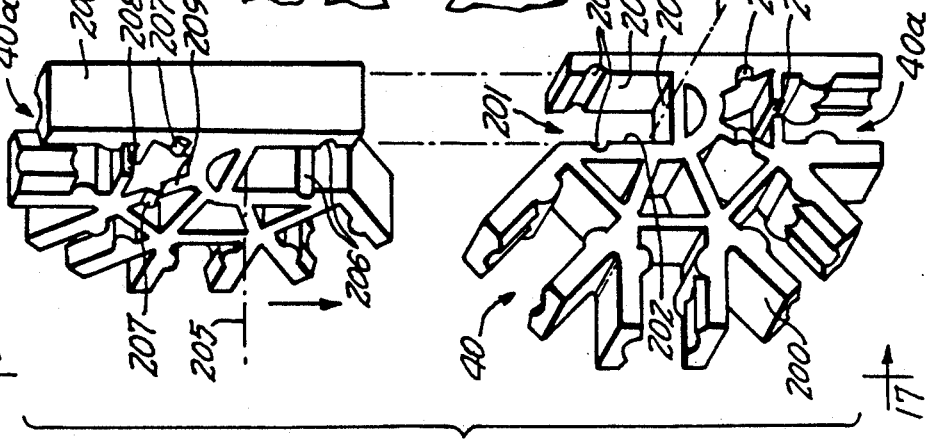

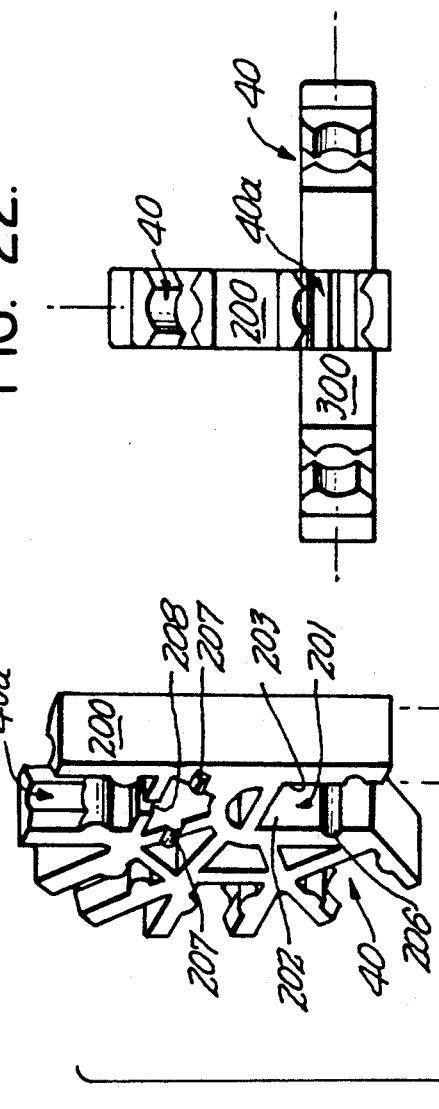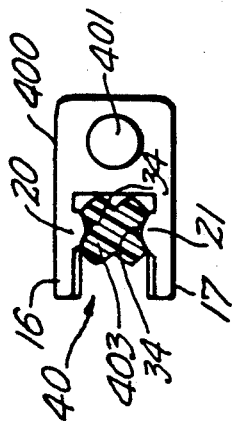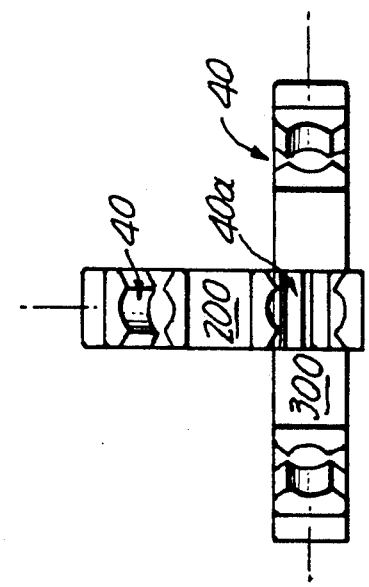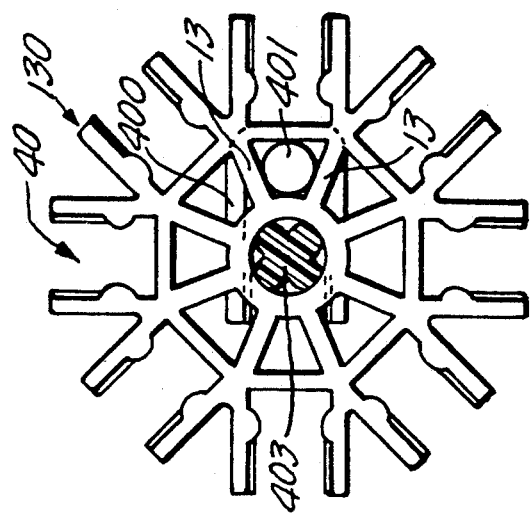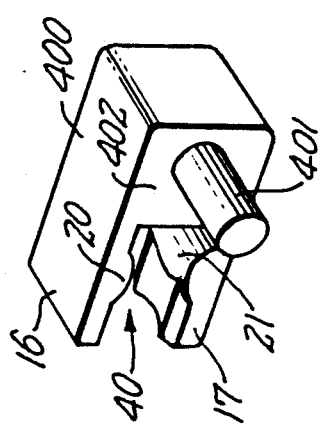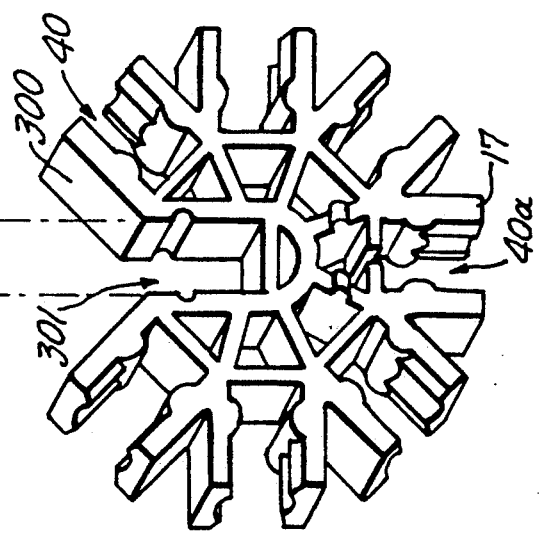

CONSTRUCTION TOY SYSTEM

RELATED APPLICATIONS

This application is closely related to, and constitutes a continuation-in-part of, my copending application Ser. No. 687,386, filed Apr. 18, 1991, now U.S. Pat. No. 5,137,486, granted Aug. 11, 1992, and is a continuation on part of my copending application Ser. No. 625,809, filed Dec. 11, 1990, now U.S. Pat. No. 5,061,219, granted Oct. 29, 1991, the disclosures of which are incorporated herein by reference.

BACKGROUND AND SUMMARY OF THE INVENTION

In any above mentioned patent and application, I disclose a novel and improved form of construction toy comprising connector elements, and strut elements adapted to be removably engaged with the connector elements to form composite structures. In the earlier patent and patent application, certain forms of connector elements are described, which incorporate a variety of unique and advantageous features greatly enhancing performance while enabling the elements to be mass-produced at very low cost by injection molding techniques. Common to both of the earlier application and patent is a structure in which the connector elements are formed with at least one open-ended recess for receiving and retaining a strut element by its end. Each recess is formed with an inner end wall and a pair of spaced-apart side walls. The side walls are formed with concave grooves extending longitudinally from the open end of the recess, toward the inner end wall, but terminating short of the end wall. A strut element, having a generally cylindrical envelope, is arranged to be received within said concave grooves and thus aligned along the axis of the recess. Cooperating rib and groove means are provided on the recess walls and on the end of the strut element such that, when the strut element is forced laterally into the open side of a recess, it is both gripped and aligned by the grooved side walls of the recess, and locked against axial motion by the cooperating rib and groove arrangement. The described structural arrangement is, in large part, employed throughout the inventions described hereinafter, being utilized to form connector elements of a wide variety of geometric configurations. The arrangement is such to provide an overall construction toy system which accommodates virtually unlimited possibilities for the design and construction of formations and structures, both static and dynamic in character.

In part, the present invention is directed to the construction of connector elements having from one to a substantial plurality of socket-forming recesses for the reception of rod-like strut elements. In a particularly advantageous embodiment of the construction system, connector elements having a plurality of socket-forming recesses are arranged so that the individual recesses are angularly spaced by 45° or multiples of 45°, although this particular angular arrangement is not conceptually critical. Thus, in a typical construction toy system, connector elements typically may be provided with one to eight socket-forming recesses arrayed about a central axis.

In certain cases, and as particularly described in my U.S. Pat. No. 5,137,486, one of the recess positions of a connector element may be especially designed for cooperative assembly with a second connector element having a similar recess position, providing for an assembly of connector elements with arrays of socket-forming recesses disposed in more than one plane. As disclosed in my U.S. Pat. No. 5,137,486, an assembly of connector elements can be provided which accommodates the mounting of strut elements extending in four planar directions from a central axis. According to the disclosure of the present application, modified forms of such connector element assemblies are provided in which strut elements extend in three planar directions (forming a Tee-shaped joint) or in two planar directions (forming a right angular corner joint).

In accordance with another aspect of the present invention, the design and construction of the socket-forming recesses, on the one hand, and the ends of the strut elements, on the other hand, is such that the cooperative action of the rib and groove means serves to yieldably urge the strut elements axially into tight end face contact with the end wall of the recess. This provides for a significant degree of additional stability in the connection between the strut and connector.

To particular advantage, the construction toy system of the present invention includes a series of struts of graduated lengths, graduated in accordance with a predetermined formula such that when two struts of a given length in a series are joined with connector elements to form a right angularly related structure, the strut of the next larger length in the series is of an appropriate length to be joined in the assembly along the hypotenuse of the triangular structure. In this manner, a large structural assembly may be formed utilizing rigid triangular structural subassemblies of various different sizes for maximum strength and rigidity.

In the system of the invention, in which a series of strut elements of graduated lengths is provided according to the before mentioned principle, a structure consisting of a pair of like strut elements of a given length in the series, mounted on opposite sides of a connector element so as to be coaxial, are equal in length to the length of a strut element two sizes larger in the series. This arrangement provides for an extraordinary degree of flexibility in the arrangement of structural parts in any assembly.

A significant aspect of the foregoing geometric relationship is the fact that the strut elements can be assembled with the connector elements by lateral snap-in assembly, so that the center to center distance of a pair of connector elements does not have to be enlarged in order to receive a strut element. This enables a structure to be easily added to and/or modified even after it has reached a stage of substantial rigidity.

To advantage, the rod-like strut elements of the new construction toy system are provided throughout most of their length with a grooved cross section, preferably an "X-shaped" cross section. The longitudinally extending grooves formed by the "X-shaped" cross section of the rods enables the rods to be inserted crosswise into the open ends of socket-forming recess of the connector elements and pressed into alignment with opposed rib-like projections provided on the gripping arms. The rib-like projections are caused to be snap fitted into opposed longitudinally extending grooves in a strut element, to tightly grip the strut element in a crosswise orientation in the connecting element. This provides for an additional dimension in construction possibilities.

Among the structural possibilities enabled by the last mentioned feature of crosswise gripping of structural elements is the assembly of articulated belt-like structures, which can be incorporated into dynamically operated toy structures, such as bulldozers, tanks, conveyor belts and the like, and also static structures such as catenary suspension elements. To this end, one of the forms of connector elements provided by the invention is an element having a single socket-forming recess at one end, and a cylindrical hub section at the opposite end. As will be described in greater detail hereinafter, a belt-like tread or other structure can be assembled from such elements by connecting a series of single unit connector elements in laterally spaced relation with a common, crosswise gripped strut element. The hub portions of all of the connector elements are aligned and receive a second rod-like structural element. To the second rod-like structural element are mounted a second series of side-by-side connector elements, gripping the strut element in crosswise fashion and forming an articulated joint. This assembly may be repeated any number of times, to provide either an endless belt or track, or one of finite length, as dictated by the requirements of the structure being assembled.

In general, connector elements utilized in the construction toy system of the invention are provided with central hub openings to closely but movably receive the strut elements for free rotation. For many dynamic structures, a driving relationship between a strut element, functioning as an axle, and an associated connector element may be desired. To this end, the construction toy system of the invention incorporates a drive element comprising a socket-forming recess of the type described, which is intended for the crosswise reception of a strut element functioning as an axle for an adjacent connector element. The connector elements advantageously are of an open construction, formed with a central hub cylinder forming a bearing, a plurality of spoke-like webs extending radially outward from the hub cylinder and a radial array of socket structures. The drive element according to the invention is formed with a laterally extending drive pin arranged to be received between adjacent spoke-like webs of a freely rotatable connector element, in order to cause the connector element to be locked in rigid, driving relation to the strut on which it is supported. If desired, a pair of drive elements may be attached to the strut element on opposite sides of an otherwise rotatable connector element, thus functioning to lock the connector element in a given position axially, and also to provide for a rotary driving relationship between the connector and the strut.

For a more complete understanding of the above and other features and advantages of the invention, reference should be made to the following detailed description of preferred embodiments of the invention, and to the accompanying drawings.

DESCRIPTION OF THE DRAWINGS

FIGS. 16-20 are various views illustrating a modified form of connector element of the invention which is capable of assembly with a like connector element to form an arrangement of strut-receiving sockets in two planar directions from a common vertical axis.

FIGS. 21, 22 illustrate a connector element of the type shown in FIGS. 16-20, as assembled with a connector element of my copending application Ser. No. 687,386, to form an assembly with socket-receiving recesses extending in three planar directions, in the form of a Tee.

FIG. 23 is a perspective view of a drive element constructed according to the invention, for crosswise reception of a strut element serving as an axle, and provided with a driving lug.

FIG. 24 is an elevational view of the driving element of FIG. 23, showing a strut element gripped in crosswise relation therein.

FIG. 25 is a view, similar to FIG. 24, showing in addition a connector element received on the strut element and drivingly engaged for rotation therewith.

DESCRIPTION OF PREFERRED EMBODIMENTS

Figure 1:
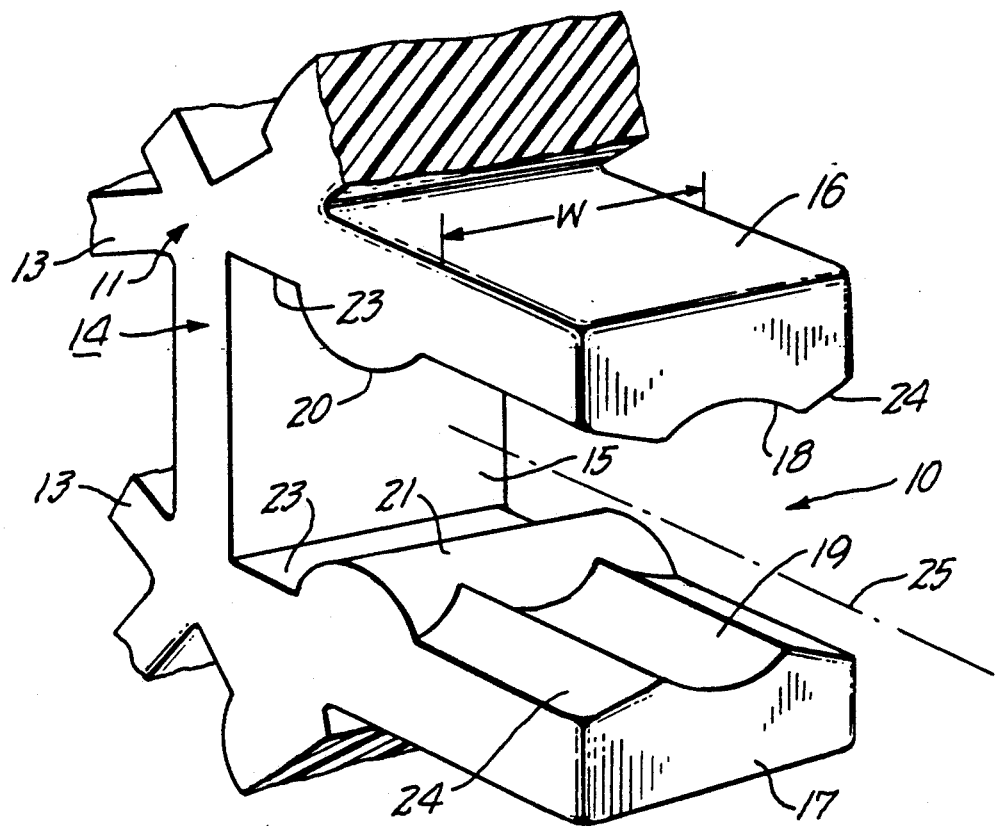
FIG. 1 is a greatly enlarged perspective view of a connector element according to the invention, showing details of a socket-forming recess for the assembly of rod-like strut elements.

Referring now to the drawings, FIG. 1 shows details of a single socket-forming recess 10, forming part of a connector element 11. The connector element may incorporate one or more socket-forming recesses. In the specific illustration of FIG. 1, the connector element 11 may be of a general type shown in FIGS. 4-10, for example, provided with a central hub 12 from which extend a plurality of spoke-like radial walls 13 connected at their outer ends with an octagonal wall structure 14 comprised of a plurality of individual wall sections 15, each forming the inner end wall of a socket-forming recess 10.

Extending outward from each of the end wall sections 15 are spaced-apart gripping arms 16, 17. The outer portions of the gripping arms 16, 17 are formed with longitudinally extending grooves 18, 19, which are concentric about a central longitudinal axis 25 of the recess. The grooves 18, 19 are terminated at their inner ends by transversely extending ribs 20, 21 integral with the gripping arm 16, 17 and projecting into the recess to form a constricted throat area therein. The ribs 20, 21 may be of cylindrical contour. In an advantageous embodiment of the invention, in a recess 10 designed to hold a strut element of about 0.250 inch diameter, the ribs may have a typical radius of about 0.088 inch, located on a center spaced about 0.12 inch from the surface of the end wall 15. It will be understood, of course, that specific dimensions disclosed herein are not critical and are not intended to be limiting, but are used only to facilitate understanding of the invention.

The inner end extremity of the recess, defined by the end wall 15, the transverse ribs 20, 21, and side wall portions 22, 23 of the gripping arms comprises a locking section, for receiving the flanged end extremity of a strut element, as will be further described.

Along the outer, grooved portions of the gripping arms 16, 17, the longitudinal edges are bevelled at 24, at a suitable angle (for example 15°) providing outwardly divergent entry surfaces to accommodate sideways, snap-in assembly of an elongated strut element into the recess. This arrangement is described in more detail in my above mentioned patent and application.

Desirably, the connector element and strut elements are injection molded of a suitable structural plastic material. One such material suitable for the purpose as an acetal copolymer marketed by Hoechst Celanese, Chatham, N.J., under the trade designation "Celcon M270".

Figure 11:
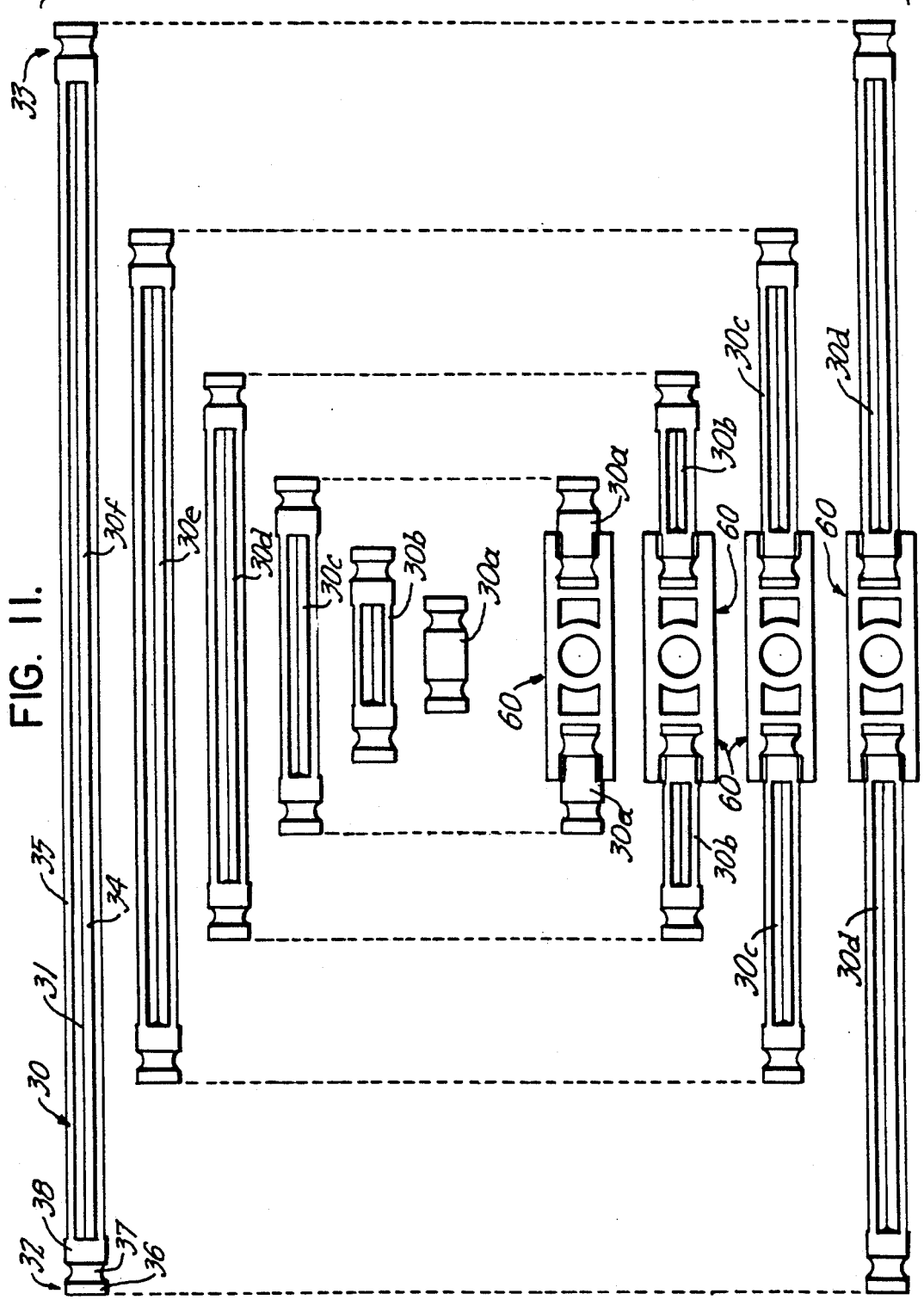
FIG. 11 is a group view illustrating a series of strut elements of graduated length according to principles of the invention and also the relationship of the length of a given strut of a series to smaller struts joined together coaxially by a connecting element.

A typical strut element, as shown at 30 in FIG. 11 comprises a body portion 31 and opposite end portions 32, 33. The body portion 31, which comprises most of the length of the structural element, advantageously is formed of an "X-shaped" cross section (see FIG. 15, for example), with alternate grooves 34 and ribs 35 arranged at 90° intervals. The end portions 32, 33 of the strut elements each comprise a flanged portion 36 at the end extremity, an annular groove 37 adjacent thereto and, typically, a cylindrical portion 38 adjacent to the annular groove. As described in the before mentioned patent and application, the strut elements are arranged to be inserted laterally into the socket-forming recesses of the connector elements, herein designated generally by the reference numeral 40, with the flanged end extremity 36 received in the locking section formed by innermost portion of the recess. The transverse ribs 20, 21 of the connector recess are received in the annular groove 37 of the strut, and the cylindrical portion 38 of the strut is gripped by the cylindrical grooves 18, 19 of the connector recess. When the end portion of the strut element is pressed laterally into a socket-forming recess, the bevelled surfaces 24 are engaged and progressively forced apart by the cylindrical surface portion 38 of the strut, forcing the gripping arms 16, 17 to separate yieldably a distance sufficient to allow the cylindrical portion 38 to be received within the grooves 18, 19.

Figure 12:
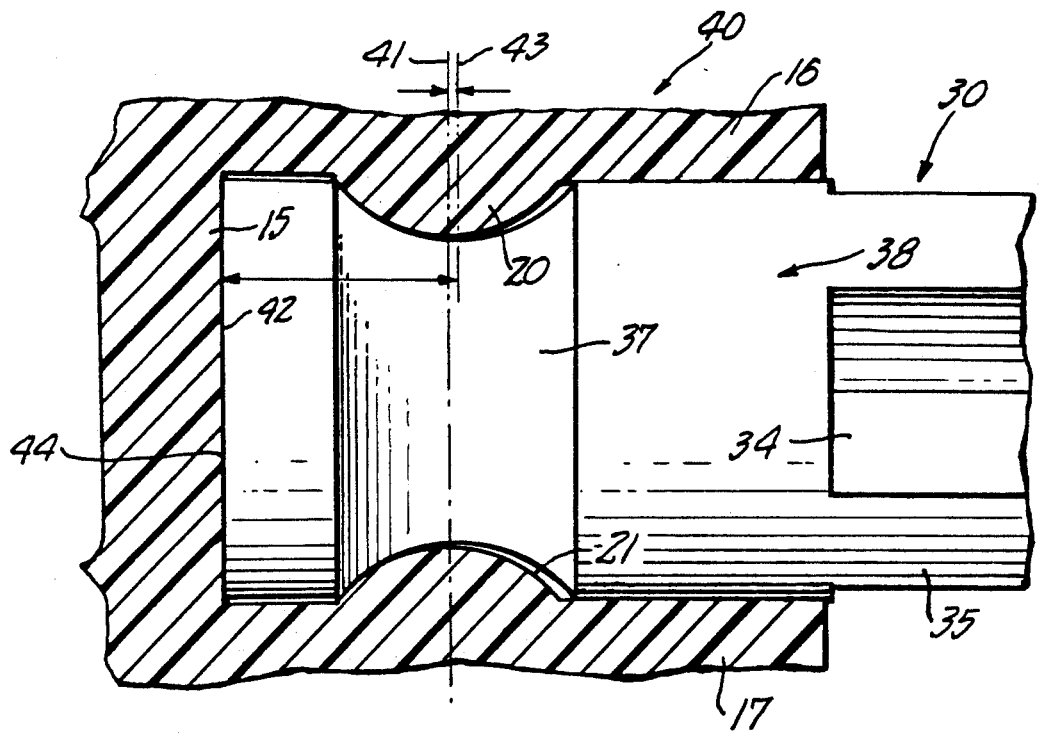
FIG. 12 is a greatly enlarged view illustrating the socket portion of a connecting element in cross section as joined with a strut element, showing the relationship of locking groove and projection for urging the end face of the strut into tight contact with the base wall of the recess.

To particular advantage, and as shown in FIG. 12, the configuration of the socket-forming recesses 40 and struts 30 are such that the center of curvature of the ribs 20, 21 is located on an axis 41 which is offset from the surface 42 of end wall 15 a distance slightly less than the offset between the axis 43, containing the center of curvature of the annular groove 37, and the end surface 44 of the strut element. As a result, when the strut element is forced laterally into gripped position in the recess 40, the ribs 20, 21 are in pressure contact with side portions of the annular groove, in a manner to force the strut end surface 44 into tight face-to-face contact with the surface 42 of the recess end wall. By tightly holding these two surfaces in face-to-face contact, a desirable degree of additional rigidity is imparted to the assembly of the strut and connecting element.

In the construction toy system of the present invention, connector elements may be formed in a wide variety of types and styles, having from one to a plurality of socket-forming recesses 40. In a particularly advantageous embodiment of the invention, connector elements having more than one recess are configured so that recesses are separated angularly by 45°, or a multiple thereof, although it will be understood that other configurations are useable within the teachings of the invention.

Figure 2:
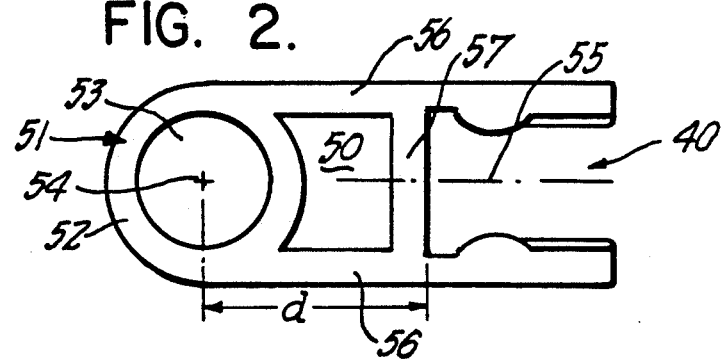
FIG. 2 is a side elevational view of a single socket connector element constructed in accordance with the principles of the invention, for receiving one strut element axially in a socket-forming recess and a second strut element in a hub bearing, disposed at right angles thereto.

In FIG. 2, a single recess connector element 50 is illustrated. It includes a hub section 51 defined by a cylindrical wall 52. The inside diameter of the hub cylinder is approximately the diameter of a cylindrical envelope formed by the strut elements 30. The diameter of that cylindrical envelope corresponds to the diameter of the cylindrical end portions 36, 38 of the strut element, and also to the diametric dimensions of the ribs 35. The arrangement is such that a strut element may be freely received in the cylindrical opening 53 of the hub, with a slight clearance to accommodate free rotation and free longitudinal movement of the struts within the hub cylinder. The axis 54 of the hub cylinder is disposed at right angles to the longitudinal axis 55 of the recess 40. To minimize weight and material usage, as well as for other reasons, the connector element of FIG. 2 is of relatively open construction (as are other connector elements described herein). Accordingly, the wall 55, which forms the end wall of the recess 40, is spaced from the hub axis 54 by a pair of space web sections 56, which are integral with the wall 55 and the hub cylinder 52.

Typically and advantageously, the connector elements are constructed of a predetermined, uniform thickness in the direction of the hub axis 54. Thus, the thickness of the connector element illustrated in FIG. 1, as reflected by the overall width W of the gripping arms 16, 17 represents a uniform width for most if not all of the connector elements illustrated and described herein. Typically, the width W is approximately equal to the diameter of the cylindrical envelope of the strut elements. In an advantageous form of the invention, this is slightly less than one-quarter inch. A thickness of approximately 0.244 inch has been found to be particularly desirable, in that it permits, in most cases, connector elements to be assembled side-by-side, cross-ways with respect to a strut, over the full length of the central body of the strut, with virtually no space left at either end. This allows structures to be formed with, in effect, a solid wall of elements joined to a transversely disposed strut across the full width of the body portion of the strut.

Figure 3:
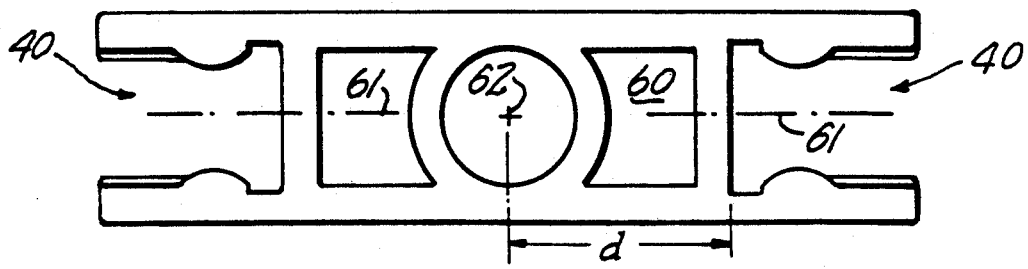
FIG. 3 is a side elevational view of a two element connector, having strut-receiving sockets disposed on opposite sides of a central hub bearing.

The connector device illustrated in FIG. 3 is similar in large measure to that shown in FIG. 2, but includes a pair of socket-forming recesses 40 angularly separated by 180°, with the longitudinal axis of the respective socket-forming recesses being coaxially aligned and intersecting with the hub axis 61. The connector element of FIG. 3 is particularly useful for joining a pair of strut elements end to end, in coaxially aligned relation, as reflected in FIG. 11. For this and other reasons, the distance from the hub axis 61 to the outer face of the recess end wall (corresponding to the surface 42 in FIG. 12) is the same for both recesses of the connector element 62 of FIG. 3 as for the single connector element 50 of FIG. 2. This difference is designated by the letter "d" in FIGS. 2 and 3. It will be further understood that this geometric relationship is applied to the several varieties of connector elements illustrated herein such that, in all cases, a strut element secured in a socket-forming recess of a connector element is positioned a fixed, predetermined distance from the central hub axis of the connector element.

Figure 4:
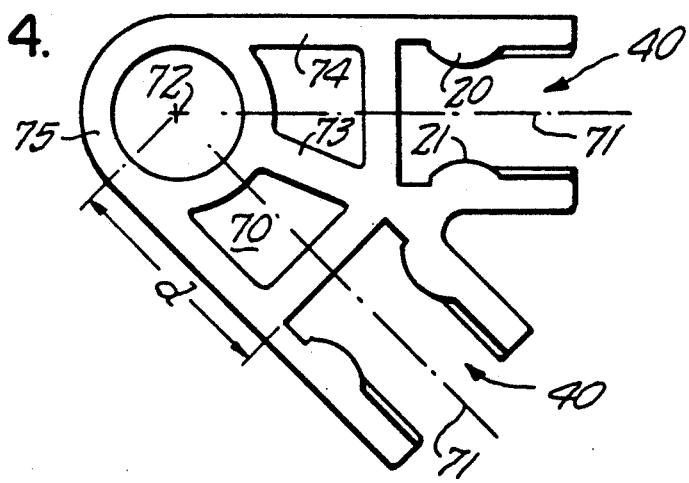
FIGS. 4-10 illustrate other modifications of connector elements provided in all cases with a central hub bearing and, in individual cases, from two to eight strut-receiving sockets, angularly spaced at 45°.

In the illustration of FIG. 4, a connector element 70 is shown, which also is provided with two socket-forming recesses 40. These are aligned along axes 71 intersecting with a hub axis 72 disposed at right angles thereto. The construction of the hub cylinder, recesses 40, etc. is generally the same as described with respect to the connector elements 50 and 60. However, in the modification of FIG. 4, the strut-receiving recesses 40 are spaced apart by an angle of 45°.

Figure 5:
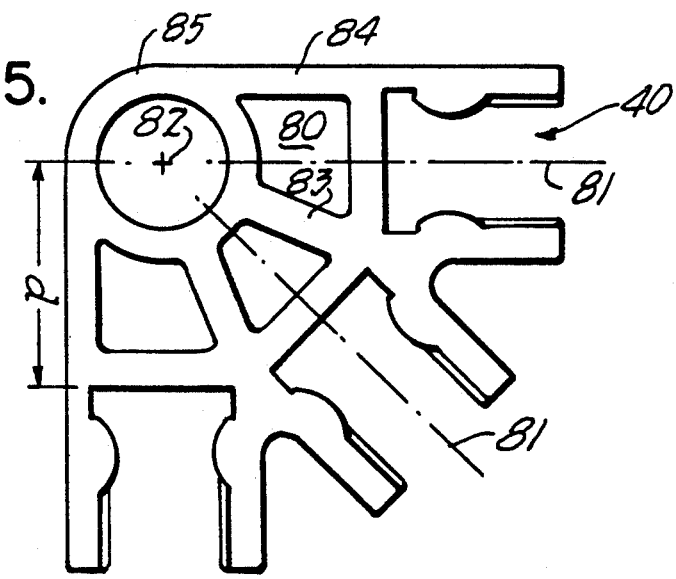
Figure 6:
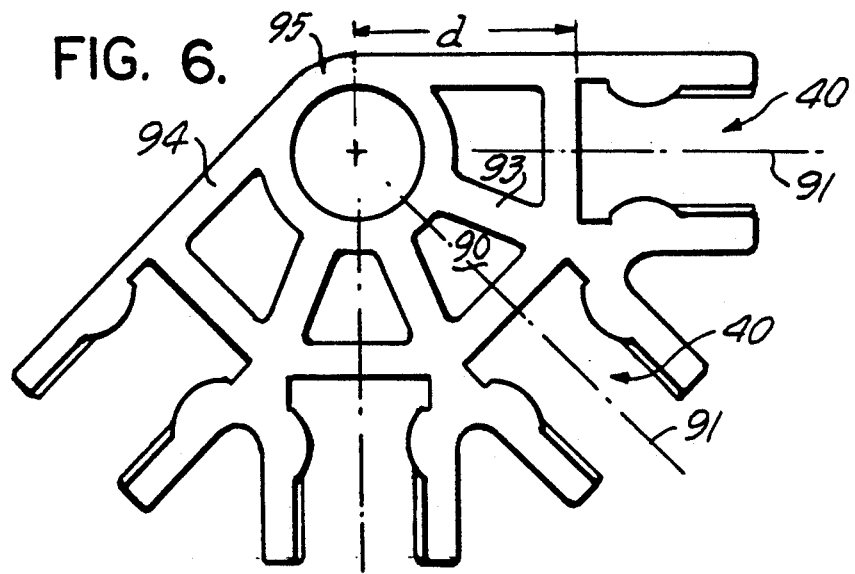

In the connector elements 80, 90 of FIGS. 5 and 6 respectively, the connector elements are provided with three and four strut-receiving recesses 40 respectively, in each case arrayed along axes 81, 91 intersecting with a hub axis 82, 92 and angularly spaced 45° apart. As reflected in the views of FIGS. 4-6, the connector elements therein shown include intermediate, radially disposed spoke-like walls 73, 83, 93 which extend radially with respect to the hub axes 72, 82, 92 and are joined integrally with end walls of adjacent recesses 40. The outermost walls 74, 84, 94, on the other hand, extend into tangency with the respective hub cylinders 75, 85, 95.

Figure 7:
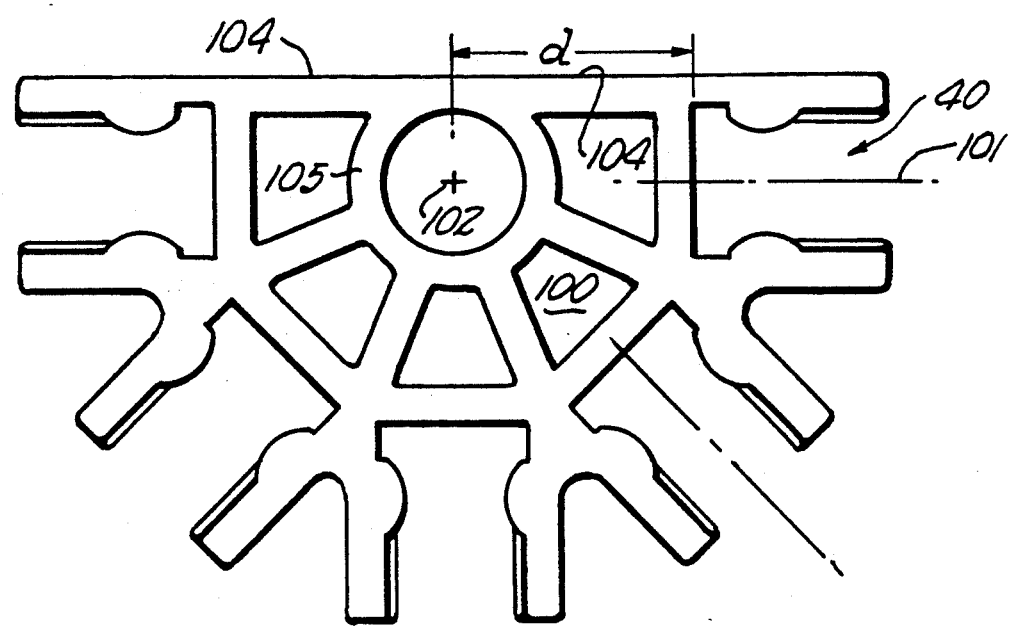
Figure 8:
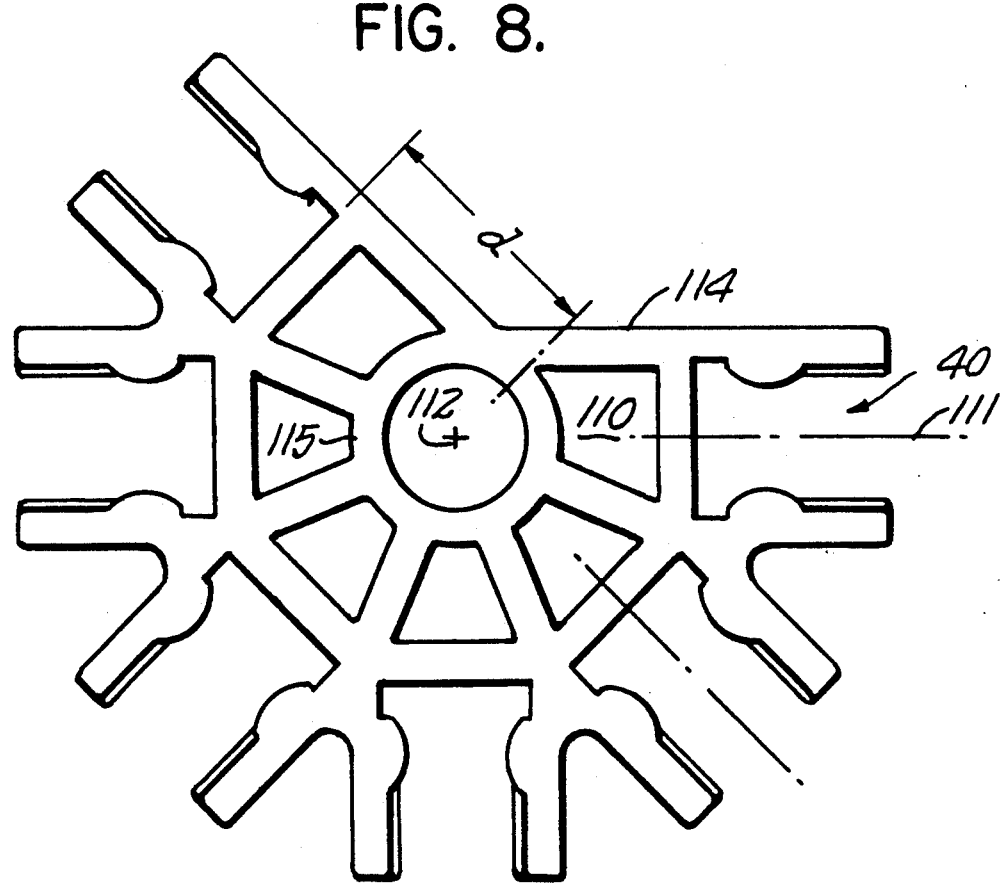
Figure 9:
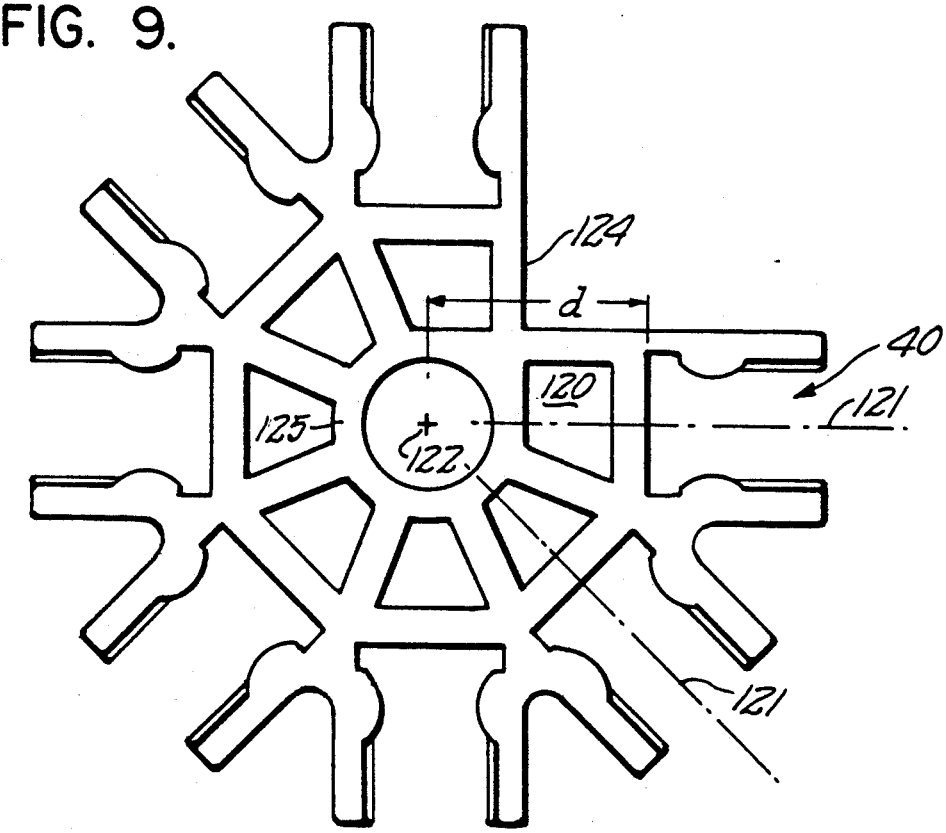

In the illustrations of FIGS. 7-9 connector elements 100, 110, 120 are formed to have, respectively, five, six and seven socket-forming recesses 40, each arrayed along an axis intersecting and extending radially from the hub axis 102, 112, or 122. The several recess axes 101, 111 and 121 are spaced apart at an angular distance of 45°, as in the case of the connectors of FIGS. 4-6. Preferably, in each of the connector elements of FIG. 7-9, the exterior wall sections 104, 114, 124 are arranged to be tangent to the hub cylinders 105, 115, 125, for both esthetic and functional purposes. The walls 104 of the connector element 100, for example, in conjunction with the continuing wall of the associated socket-forming recess, provide a broad, flat surface on which to support the connector element and/or a flat surface to define an outer edge of a structure.

Figure 10:
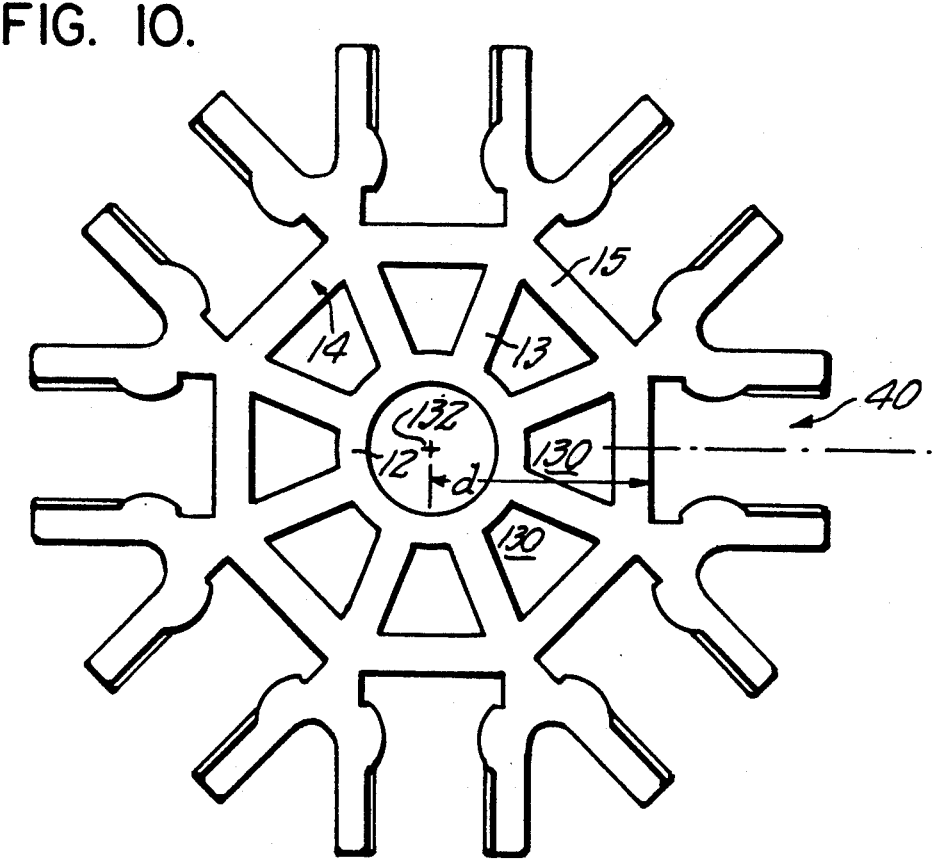

The connector element 130 of FIG. 10 is substantially of the configuration described in our before mentioned U.S. Pat. No. 5,061,219, granted Oct. 29, 1991, in this instance being formed as part of a series of connector elements of common dimensions. In this respect, the distance "d" from the hub axis 132 to the face of any recess wall is the same uniform distance as in the other illustrated forms of connector elements.

Figure 13:
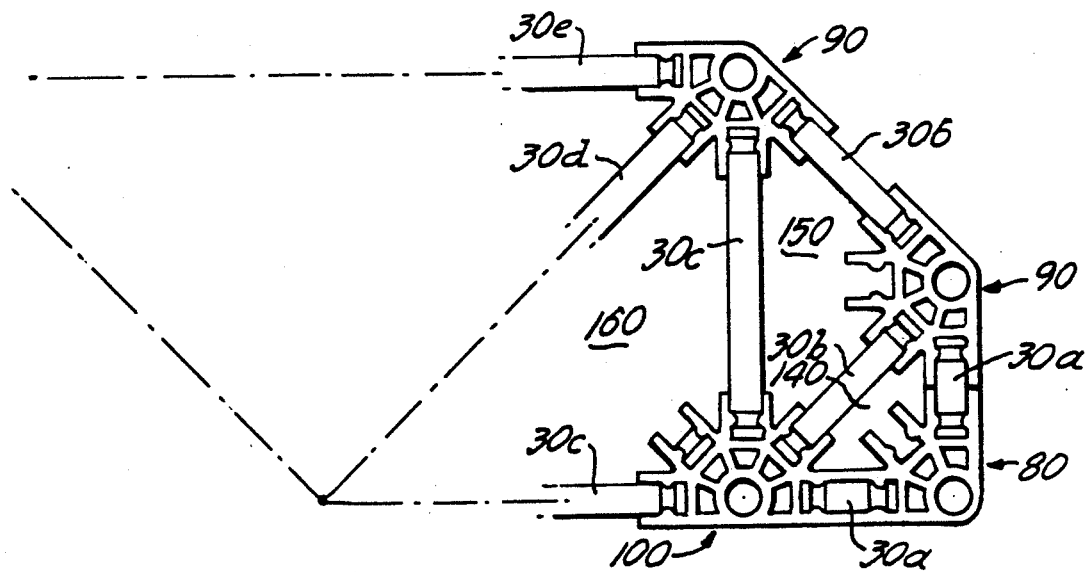
FIG. 13 is an elevational view of an assembly of strut and connector elements arranged in triangular sub-units of increasing size and illustrating the size relationship of a plurality of strut elements in a series.

With reference to FIGS. 11 and 13, the construction toy system of the invention advantageously incorporates strut elements in various graduating lengths, according to a predetermined size progression, such that strut elements of various sizes in a set may be assembled together with the before described connector elements to form a series of right triangular structural units of an assembly. In the composite illustration of FIG. 11, there are shown a series of strut elements 30a-30f, inclusive, of progressively increasing lengths. In the system of the invention, the progression of lengths is such that when any two strut elements of a given size are joined with a connector element to form two sides of a right triangle, the strut of the next greater length is of the appropriate size to form the hypotenuse of that triangle. For example, in FIG. 13, a three-position, right angle connector element 80 is joined with two strut elements 30a of the smallest size, forming the sides of a right triangle. In the illustration, the vertically oriented strut 30a is joined with a four-position connector element 90 and the horizontally oriented strut element 30a is joined with a five-position connector element 100. A strut element 30b, constituting the next size longer than the connector elements 30a, is joined with the connector elements 90, 100, forming the hypotenuse of a small right triangle. Importantly, the construction toy system of the invention accommodates lateral, snap-in insertion of the strut elements into the connector elements, so that assembly of a strut element, such as 30b, can be made with a pair of spaced-apart connector elements 90, 100 in an already rigid structure. Assembly does not require the structure to be distorted to accommodate insertion of the strut elements, and this enables complex rigid structures to be assembled, modified etc. without difficulty.

In the illustration of FIG. 13, the element 30b, which forms the hypotenuse of the first described right angular structural element, designated by the reference numeral 140, itself forms one side of a right triangular structural element 150 of a larger size. In this respect, the connector element 90 is joined with a second strut element 30b to form two sides of the triangle 150. A second four-position connector element 90 is joined to the upper end of the upper strut element 30b, and a strut element 30c, being the third element in the length progression, is joined with the upper connector 90 and the before mentioned connector 100 and constitutes the hypotenuse of the triangular structural element 150. As is evident in FIG. 13, a pair of the strut elements 30c may in turn constitute the sides of a still larger right triangular structural unit 160, the hypotenuse of which is constituted by the next larger size strut element 30d. Progressively larger right triangular structural units may be assembled, within the limits of the maximum length strut element provided by the set.

In the system of the invention, the length progression of the strut elements is in accordance with a predetermined formula. Thus, in a system of "n" different lengths, each strut length is determined according to the formula:

$L_x = (1.414)^{(x-1)} * D_{min} - (2 * d)$, where $L_x$ = Length of the $x^{th}$ strut of a series of 1 to "n", $D_{min}$ = the spacing between hub axes of two connector elements joined by the shortest strut element of the series, d = the distance from the hub axis to the end wall of the socket-forming section.

Of course, it is known to assemble structures of right triangular units, including structures in which the hypotenuse of one triangular constitutes a side of a second and larger right triangular unit. In the construction toy system of the present invention, however, unique advantages are derived from the design of the connector elements and strut elements to accommodate lateral, snap-in assembly of the strut elements into the connectors. This enables parts to be assembled and disassembled from the structure, without involving change of the center-to-center distances between connector elements and connection points. Thus, complex, rigid, multi-dimensional structures can be designed and assembled for great facility.

As is reflected in the composite view of FIG. 11, there is also an advantageous geometric relationship between the graduated length strut elements 30a–30f and connector elements in which there are socket-forming recesses oriented 180° apart. This includes in particular the connector element 60 (FIG. 3), which is a two-position connector element having its recesses 40 coaxially aligned and oppositely facing. This connector element serves usefully as a splicing connector, to join two shorter strut elements to form a longer strut assembly. When one of the connector elements 60 (which may conveniently be referred to as a splice connector) is joined with two struts of a given size. A strut assembly is formed which is equal in length to a strut two sizes larger than the strut elements joined by the splice connector. Thus, as shown in FIG. 11, two of the shortest strut elements 30a are spliced to form a strut assembly equal in length to the strut 30c. Two of the next size strut elements 30b are spliced to form a strut assembly equal in length to the strut 30d. Additional corresponding assemblies are shown in the composite view of FIG. 11. It is possible, of course, to join in a splice connector 60 strut elements of different lengths, in order to develop strut assemblies of a length different from the standard, progressive strut length illustrated in FIG. 11.

As will be understood, since all of the connector elements, regardless of configuration, employ a common spacing "d" from hub axis to the end surface of the socket-forming recess, the relationships illustrated in FIG. 11 will obtain in any situation in which strut elements are assembled to a connector with a coaxial orientation.

Figure 14:
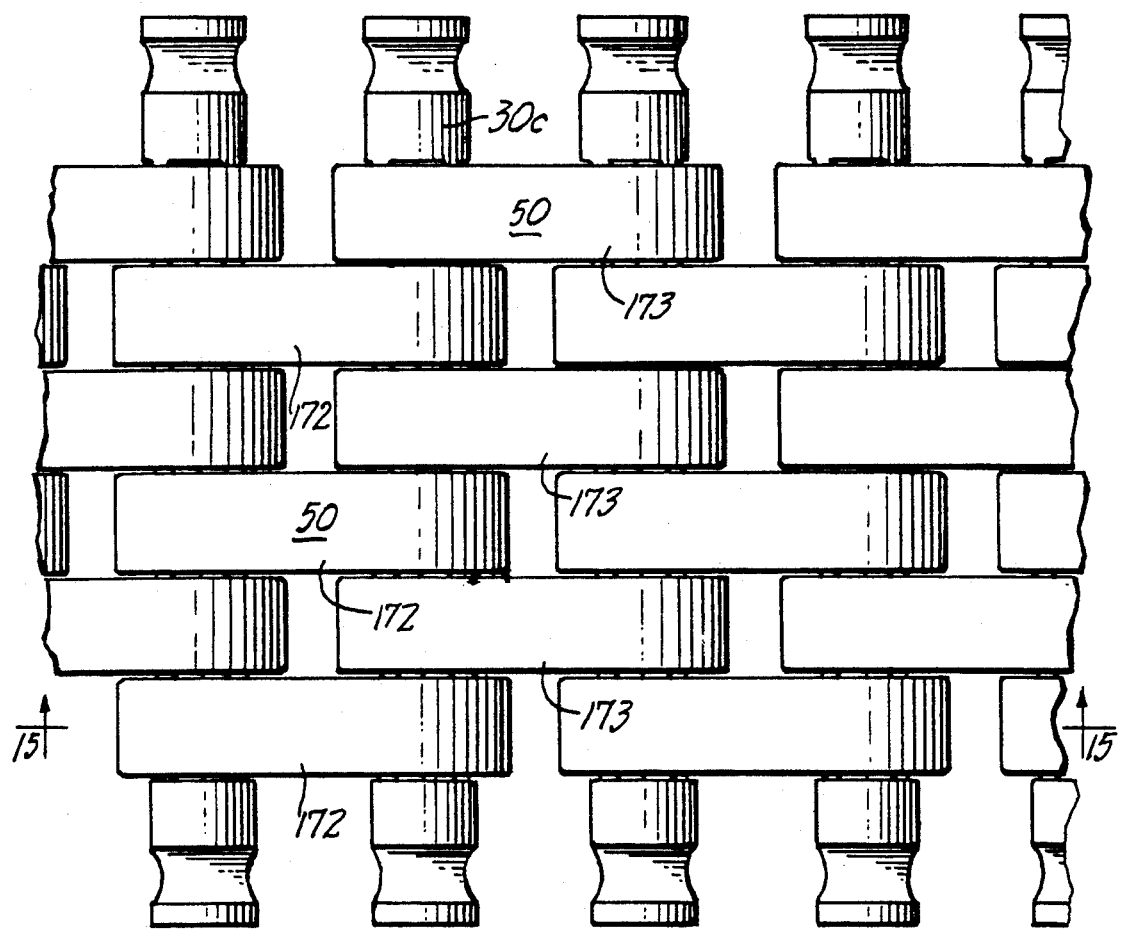
FIG. 14 is a top plan view of an articulated belt or tread structure according to the invention constructed of a plurality of single unit connectors and a plurality of strut elements mounted in crosswise relation therein.
Figure 15:
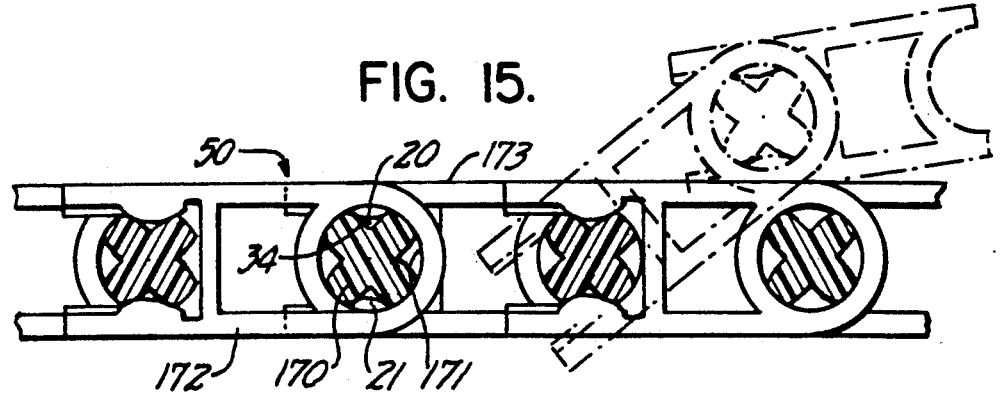
FIG. 15 is a cross sectional view as taken along line 15—15 of FIG. 14.
Figure 29:
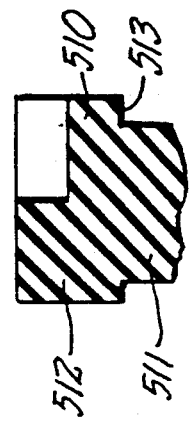
FIGS. 28, 29 are cross sectional views as taken generally on lines 28—28, 29—29 respectively of FIGS. 26, 27.

Referring now to FIGS. 14 and 15, there is illustrated a particularly advantageous and useful structural form which can be assembled with the components of the construction toy set of the invention. The assembly shown in FIGS. 14 and 15 is comprised of a plurality of single recess connector elements 50 (FIG. 2) joined with a plurality of strut elements of a predetermined uniform size, such as elements 30c as reflected in FIG. 11. In the illustrated arrangement, a first plurality (three) in the illustration of single unit connector elements 50 are arranged in side-by-side relation, spaced apart by the width of a connector element, and are rotatably connected to a strut element, as designated by the reference numeral 170 in FIG. 15. The strut element 170 is passed through the hub opening 171, in which it is freely received. For purposes of identification, the reference numeral 172 is applied to connector elements of the first group. Alternating with the connector elements 172 are similar connecting elements, identified by the reference numeral 173. The connector elements 173 are snap fitted onto the strut element 170, with the rib portions 20, 21 of the connector element tightly received in the grooves 34 of the strut element, so as to tightly grip the strut element. Thus, while the individual connector elements 172 are freely movable with respect to the strut element 170, the alternating connector elements 173 are rigidly secured thereto, both against rotation and sliding movement. A succession of such assemblies provides an articulated belt-like structure, which can be endless in form or of finite length, as desired, and can be of any suitable width for the purpose intended. As shown in FIG. 1, the end extremities of the strut elements project a short distance from each edge of the belt-like assembly.

Structures of the type shown in FIGS. 14, 15 have a wide variety of advantageous uses. Among these is the formation of tracks, for track-laying vehicles such as bulldozers, cranes, tanks and the like. Panel-like structures can also be assembled to function, in a toy structure, as wall or roof panels, for example, floor surfacing and the like. A narrow assembly can be utilized as a flexible cable-like element, for example.

With reference now to FIGS. 16–22, there is shown a particularly advantageous form of connector element arranged for assembly with another connector element having similar features, to provide a connector assembly providing means for joining strut elements extending in a plurality of planar directions. The embodiment of the invention disclosed in FIGS. 16–22 is closely related to the subject matter of my copending application Ser. No. 687,386.

In the composite view of FIG. 16, there is shown a pair of connector elements 200 of a type closely related to the element disclosed in my related U.S. Pat. No. 5,061,219. The illustrated connector elements 200 are formed with four recess positions 40, angularly spaced at 45°. Directly opposite one of the recess positions 40a of each element is positioned a special recess 201. The recess 201 is defined by spaced-apart side walls 202, 203 and a bottom wall 204. The side walls 202, 203 are spaced apart a distance equal to the standard thickness of a connector element and are arranged symmetrically to an imaginary plane extending through the geometric center of the connector element 200 and containing the longitudinal axis of the oppositely oriented strutreceiving recess 40a. The exposed surface of the end wall 204 lies on a plane at right angles to the previously mentioned plane, also passing through the principal axis of the connector, identified by the reference numeral 205.

The connector elements 200 are arranged to be assembled together in the manner reflected in FIGS. 16–18, with the respective special recess portions 201 facing each other and the principal planes of the respective connectors being oriented at right angles. The respective connectors 200 are pressed together until the end walls 204 of the recesses 201 are in firm face-to-face contact, so that the respective central axis 205 of each element lie substantially in a common plane.

Desirably, each of the recess walls 202, 203 is formed with a transverse groove 206 arranged to receive, in detent locking relation, ribs 207 projecting from opposite sides of spoke walls 209. Accordingly, when the two elements are assembled together, they are relatively rigidly locked together against any but intentional separation.

As reflected in FIG. 17, when the walls 202, 203 first engage the projecting ribs 207, the walls are displaced outwardly. To facilitate such displacement, it is advantageous to provide a small gap 208 in the strut-receiving recesses 40a located opposite the main recesses 201. The presence of the gap 208 enables the gripping arms 16, 17 of the opposed strutreceiving recess 40a to be easily displaced toward each other while the walls 202, 203 are being outwardly displaced by the ribs 207. When the parts are pressed together to their final positions, with the end walls 204 seated against each other, each of the sets of ribs 207 will be seated in each of the sets of recesses 206, substantially as shown in FIG. 18.

The assembled connector elements of FIGS. 16–20 provide for the support of strut elements in each of two planar directions disposed at right angles. The connector arrangement thus is perfectly suited assembling external corners of structures, as can be appreciated by observations of FIGS. 19 and 20.

In the composite view of FIG. 21, a connector element 200 of the type shown in FIGS. 16–20 is arranged to be joined with a second, seven-position connector 300, of a type specifically disclosed in my copending application Ser. No. 687,386. The connector element 300 includes a special recess 301 disposed coaxially opposite to a strut-receiving recess 40a.

Assembly of the connector elements 200, 300, to form a multi-planar assembly is accomplished in the same manner described with respect to FIGS. 16–20. The resulting assembly is of Tee-shaped configuration when viewed from above, as reflected in FIG. 22, and provides for the mounting of strut elements in each of three planar directions. This is particularly advantageous in connection with the assembly of certain structural forms, as will be readily appreciated. In the Tee-shaped assembly of FIGS. 21, 22, the upper socket position 40a is not accessible for normal, lateral snap-in assembly of a strut element, because of the presence of the associated connector element. However, by providing the gap 208 in the recess end wall, it becomes possible to insert the strut initially at an angle and to install it by a twisting motion, all as described in more detail in my related U.S. Pat. No. 5,137,486. The gap 208 allows the gripping arms 16, 17 to more easily separate, in order to accommodate a twist-in assembly of the strut.

In general, it is desired that strut elements be received in the central hub openings of connector elements with at least a minimal clearance, in order to accommodate both sliding and rotational movement between the connector element and strut. For certain applications, however, it may be desired to lock a connector element together with a strut passing through its central hub opening, for rotation in unison and/or for fixing the position of the connector element axially along the strut element. To this end, the construction toy system of the invention includes a drive element, such as illustrated in FIGS. 23–25 of the drawing, for frictionally and non-rotatably gripping a strut element. In the illustrated form, the drive element comprises a drive block 400, injection molded of suitable plastic material and advantageously incorporating a socket-forming recess 40 of the form previously described. This includes particularly the opposed projecting ribs 20, 21 defining a narrow throat area between the gripping arms 16, 17 adjacent the closed end of the recess 40, the block 400 advantageously mounts a driving lug 401 projecting laterally from one end face 402 of the block generally parallel to the alignment of the ribs 20, 21.

In a typical utilization of the drive block 400, a connecting element 130, typically of a full "snowflake" configuration, having eight strut-receiving positions, is mounted on a strut 403. To establish a fixed driving relationship between the strut 403 and the connector element 130, the drive block 400 is applied to the body portion of the strut 403, so that the respective ribs 20, 21 are received in and lockingly engaged with opposed longitudinal grooves 34 of the strut. The strut is thus tightly gripped by the jaws of the recess 40, such that the block 400 is rigidly fixed to the strut against rotation and also is frictionally restrained against longitudinal movement along the strut (being slidable therealong, however, under appropriate force).

As reflected in FIG. 25, the location of the drive lug 401 is such that, when the connector element 130 and drive block 400 are directly adjacent each other, the drive lug 401 is positioned in and substantially occupies the trapezoidal space between a pair of adjacent, radially disposed spoke-like walls 13. With the drive lug 401 thus positioned, the strut 403 and connector element 130 are locked against relative rotation, so that rotational drive applied to one of the elements is correspondingly imparted to the other.

By positioning drive blocks 400 on opposite sides of a connector element, the connector element can be locked in position, axially, at any point along the length of the body of a strut. This arrangement is particularly desirable for many dynamic structures, wherein rotation is called for.

Figure 28:
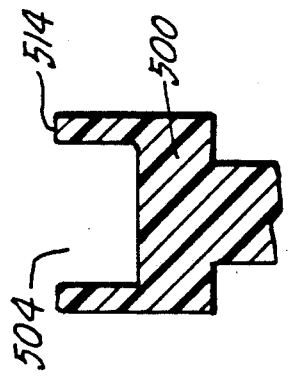
Figure 26:
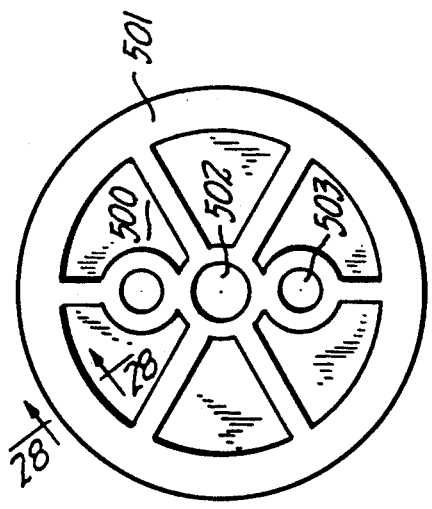
FIG. 26 is an elevational view of a combined pulley and wheel-forming element employed in the system of the invention.

For many dynamic toy assemblies, drive pulleys and/or wheels are useful and desirable elements. To advantage, a combined pulley/wheel element 500 is shown in FIG. 26. This is an injection molded part formed with an outer rim 501 and a central hub opening 502 adapted to be closely received over a strut element. Radially outward from the central opening 502 are one or more drive recesses 503. These are arranged to receive the drive lug 401 of a drive block (FIG. 23). As shown in FIG. 28, the element 500 is provided with an external annular recess 504, which enables the element to function as a pulley, when associated with an appropriate drive belt (not shown). When the element 500 functions as a pulley, it is drivingly connected to a strut element, using a drive block 400, functioning either as a drive pulley or a driven pulley, as the case may be.

Figure 27:
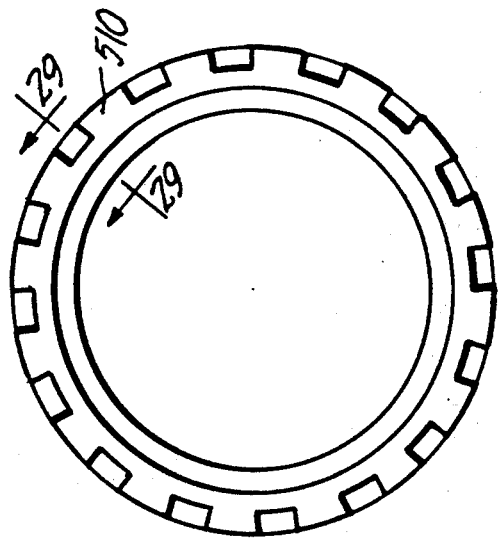
FIG. 27 is a side elevational view of a tire-like element adapted for assembly with the element of FIG. 26.

The element 500 can be covered to form a wheel by applying the tire element of FIG. 27. The tire element, designated generally by the numeral 510, is formed of a resilient elastomer, such as neoprene. The inner portion 511 of the tire is of a width to be closely received in the annular recess 504. The outer portion 512 of the tire is wider than the inner portion 511, advantageously equal in width to the thickness of the outer rim portion 501 of the wheel element 500. Shoulders 513 are formed at each side of the tire. These engage outer flanges 514 of the wheel element 500, to position the tire concentrically on the supporting rim.

When used as a wheel, the element 500 may be driven or not, as desired. If it is to be driven, then a drive block 400 is employed, as previously described.

The construction toy system of the invention provides a uniquely simplified, yet exceptionally versatile construction medium, for assembling a limitless variety of structures, both static and dynamic in character. The system easily lends itself to the production, by economical, mass production injection molding techniques of standardized building elements of a wide variety, permitting the relatively quick and simplified assembly of structures.

Particularly significant is the design of connector elements and strut elements in a manner to accommodate lateral snap-in insertion of struts into the connecting elements, with the struts being automatically locked in position along a predetermined axis, effectively restrained against any axial movement. Because of the ability to assemble elements by lateral snap-in assembly, structural units having a high degree of rigidity may be easily assembled, disassembled and modified, because the assembly/disassembly operations do not require changing of the center-to-center distance between any of the assembled components. Among other things, this greatly facilitates the design of a complete construction toy system, utilizing strut elements of graduated length according to a predetermined formulation, so that each successive size is a suitable size to serve as the hypotenuse in a right triangular structural unit the sides of which are formed by strut elements of the next smaller size.

Within the basic concepts of the invention, it is possible to construct simplified and effective forms of dynamic structures, such as endless tracks or belts, driven rotating systems and the like. These are achieved with the consistent use of standardized strut elements and standardized connecting elements. That is, the connecting elements utilize standardized socket-forming recesses, although various in number, and such recesses are located at standardized distances from the principal axis of the connecting element. Likewise, the strut elements incorporate standard end configurations, in conjunction with body portions of various length. Further, by providing for a splice connector, capable of joining two strut elements end to end, the structural combinations available from a relatively limited number of standardized strut lengths is multiplied.

The invention further enables connector elements to be assembled to each other to form multi-planar connector assemblies providing for the mounting of strut elements in a plurality of planar directions in the structures specifically illustrates herein, such assemblies can provide for mounting of struts in two right angularly related directions, or in three directions, in the form of a Tee.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A construction toy system of the type comprising a plurality of connector elements and rod-like strut elements formed of molded plastic material and removably joinable with other elements to form a coherent structure, wherein at least certain of the connector elements comprise
   (a) a socket-forming section disposed on a predetermined defined socket axis and having open sides,
   (b) said socket-forming section comprising a pair of spaced-apart, generally parallel cantilever mounted gripping arms symmetrically arranged with respect to said socket axis and defining said socket axis,
   (c) said gripping arms being formed with first interlock means co-axial with said socket axis to interlock with a strut element for releasably but firmly holding a strut element aligned with said socket axis,
   (d) second interlock means formed in said socket-forming section to interlock with a strut element for releasably but firmly holding a strut element in a predetermined axial position along said socket axis,
   and wherein at least certain of said strut elements comprise
   (e) elongated rod-like members formed with opposite end portions and intermediate portions integrally joining said end portions,
   (f) said opposite end portions being provided with first and second interlocking means for cooperative engagement with the first and second interlocking means of said connector element, whereby the respective first interlocking means hold a strut element in coaxial alignment with said defined socket axis and the respective second interlocking means hold a strut element in predetermined axial position on said socket axis,
   (g) each pair of gripping arms defining between them an open-sided, socket co-axial with said defined socket axis, and
   (h) said arms being resiliently separable to accommodate lateral snap-in reception of an end portion of a strut element from an open side of said socket forming section, in a direction transverse to said socket axis, whereby said strut element is firmly placed and positioned in fixed relation to said socket-forming section.

2. A construction toy system according to claim 1, further characterized by
   (a) said second interlocking means comprising opposed rib-like elements on said spaced-apart gripping arms, and conforming groove means on the opposite end portions of said strut elements,
   (b) said rib-like elements being oriented transversely to said socket axis to receive said conforming groove means during lateral reception of an end portion between a pair of gripping arms.

3. A construction toy system according to claim 2, further characterized by,
   (a) said socket-forming section including an end wall integral with said gripping arms and spaced from said rib-like elements,
   (b) said strut elements having end surfaces spaced from said conforming groove means,
   (c) the spacing between said rib-like elements and said end wall being such, in relation to the spacing between said conforming groove means and said end surface, that said end wall and end surface are urged into snug contact when said strut element is received in said socket-forming section.

4. A construction toy system according to claim 1, further characterized by,
   (a) said second interlocking means comprising rib-like interlocking means on one of said socket-forming section or said strut element, and conforming groove means on the other of said section or element.

5. A construction toy system according to claim 4, further characterized by,
   (a) said socket-forming section having a closed end formed by an end wall,
   (b) said strut element having an end surface,
   (c) said second interlock means yieldably urging said end surface into snug contact with said end wall.

6. A construction toy system according to claim 1, further characterized by,
   (a) said connector element additionally including a hub-forming section defining a transverse opening therein of a size and shape for the axial reception of a strut element and defining a hub axis,
   (b) said hub axis being disposed at right angles to and substantially intersecting with said defined socket axis.

7. A construction toy system according to claim 6, further characterized by,
   (a) said connector element comprising a single socket-forming section integrally associated with a single hub-forming section.

8. A construction toy system according to claim 6, further characterized by,
   (a) said connector element comprising a pair of socket-forming sections integrally associated with a single hub-forming section,
   (b) said socket-forming sections being oppositely disposed and being aligned along a common socket axis.

9. A construction toy system according to claim 6, further characterized by,
   (a) said connector element comprising a pair of socket-forming sections integrally associated with a single hub-forming section,
   (b) said socket-forming sections being aligned along respective socket axes disposed at a fixed angle of approximately 45° and intersecting each other substantially at said hub axis.

10. A construction toy system according to claim 6, further characterized by,
    (a) said connector element comprising a plurality of "n" socket-forming sections,
    (b) each of said socket-forming sections being aligned along respective defined socket axes disposed at fixed angles of approximately 45° with respect to a neighboring socket axis and all of said axes intersecting each other substantially at said hub axis,
    (c) where "n" is an integer between 2 and 8.

11. A construction toy system according to claim 10, further characterized by,
    (a) each of said socket-forming sections being disposed at a fixed predetermined distance from said hub axis,
    (b) whereby, when a strut element is retained in any socket-forming section, the end extremity of said strut element is spaced a fixed, uniform distance from said hub axis.

12. A construction toy system according to claim 11, further characterized by,
    (a) said system including a series of strut elements of graduated lengths, and wherein
    (b) in a system of "n" different lengths, each strut length is determined according to the formula
    $L_x = (1.414)^{(x-1)} * D_{min} - (2 * d)$, where
    $L_x$ = Length of the $x^{th}$ strut of a series of 1 to "n",
    $D_{min}$ = the spacing between hub axes of two connector elements joined by the shortest strut element of the series,
    d = the distance from the hub axis to the end wall of the socket-forming section.

13. A construction toy system according to claim 12, further characterized by,
    (a) a plurality of connector elements and strut elements of said system being assembled into one or more right triangles.

14. A construction toy system according to claim 12, further characterized by,
    (a) an assembly, comprising a connector element of claim 8, joined with two strut elements of length $L_x$ in a series, being equal in length to a strut element of length $L_{(x+2)}$ in said series.

15. A construction toy system of the type comprising a plurality of connector elements and rod-like strut elements formed of molded plastic material and removably joinable with other elements to form a coherent structure, wherein at least certain of the connector elements comprise
    (a) a socket-forming section disposed on a predetermined socket axis,
    (b) said socket-forming section comprising a pair of spaced-apart, generally parallel cantilever mounted gripping arms symmetrically arranged with respect to said socket axis,
    (c) said gripping arms being formed with first interlock means to interlock with a strut element for releasably but firmly holding a strut element aligned with said socket axis,
    (d) second interlock means formed in said socket-forming section to interlock with a strut element for releasably but firmly holding a strut element in a predetermined axial position along said socket axis,
    and wherein at least certain of said strut elements comprise
    (e) elongated rod-like members formed with opposite end portions and intermediate portions integrally joining said end portions,
    (f) said opposite end portions being provided with first and second interlocking means for cooperative engagement with the first and second interlocking means of said connector element, whereby the respective first interlocking means hold a strut element in coaxial alignment with said socket axis and the respective second interlocking means hold a strut element in predetermined axial position on said socket axis,
    (g) each pair of gripping arms defining between them an open-sided, axially disposed socket, and
    (h) said arms being resiliently separable to accommodate lateral snap-in reception of an end portion of a strut element in a direction transverse to said socket axis, whereby said strut element is firmly spaced and positioned in fixed relation to said socket-forming section,
    (i) said gripping arms being formed with rib-like projections extending transverse with respect to the socket axis and projecting inward toward the socket axis,
    (j) said strut element being formed, in a predetermined area between its ends, with opposed longitudinally extending grooves,
    (k) said strut element being yieldably received in said socket in an orientation disposed at 90° to the socket axis, with said rib-like projections being received in an opposed pair of said grooves,
    (l) whereby said strut element is non-rotatably gripped by said connector element with said strut element disposed parallel to said hub axis.

16. A construction toy system according to claim 15, further characterized by,
    (a) said connector element additionally including a hub-forming section defining a transverse opening therein of a size and shape for the axial reception of a strut element and defining a hub axis,
    (b) said hub axis being disposed at right angles to and substantially intersecting with said socket axis, wherein
    (c) a plurality of such connector elements are joined to form a belt-like structure,
    (d) a first group of such connector elements being arranged in side-by-side relation, spaced apart by a distance at least equal to the width of a connector element, (e) the hub axes of each of the elements of said first group being coaxially aligned, (f) a first strut element extending through the hubs of each of the connector elements of said first group, (g) a second group of such connector elements being arranged in side-by side relation, and interspersed in the spaces between connector elements of the first group, (h) the connector elements of the second group gripping said first strut element by engagement of the rib-like projections of the connector elements with an opposed pair of longitudinal grooves of said first strut element, and (i) successive additional groups of such connector elements are joined with additional struts and connected in an extended series to form an articulated belt-like structure.

17. A construction toy system according to claim 16, further characterized by, (a) said groups of connector elements and struts being connected in an endless configuration.

18. A construction toy system according to claim 16, further characterized by, (a) said strut elements being of such length, in relation to the combined width of said first and second groups of connector elements, that end portions of said strut elements project laterally from each side of the assembly.

19. A construction toy system according to claim 15, further characterized by, (a) said connector element being formed with an integral, laterally extending drive lug, (b) said connector element being mounted on a strut element with the rib-like projections of said connector element being received in opposed grooves of said strut element whereby said connector element is locked in fixed relation to said strut element, (c) an additional connector element of claim 6 rotatably mounted on said strut element, with said strut element received in said hub-forming section, (d) said additional connector element being positioned adjacent to said first-mentioned connector element, (e) said drive lug being in driving engagement with an adjacent portion of said additional connector element, whereby said additional connector element can drive or be driven by said strut element.

20. A construction toy system according to claim 19, further characterized by, (a) said additional connector element includes a central hub section receiving said strut element, (b) a plurality of spoke-like web elements radiating from said hub section, (c) said drive lug being receivable in a space between an adjacent pair of said spoke-like web elements.

21. In a construction toy system of the type utilizing a plurality of struts and connector elements for engaging the ends of said struts, an improved connector element which comprises (a) a central core defining a central axis of said connector element, (b) a plurality of strut-receiving sockets arranged generally radially about said core, (c) said core and sockets forming a connector of generally flat configuration and of predetermined thickness, (d) an open-sided recess in one side of said connector element, extending to said central axis and having a width equal to the thickness of the connector element, (e) said open-sided recess receiving a second connector element to form a composite connector element having strut-receiving sockets radiating in two planes, (f) said open-sided recess being defined by a pair of spaced-apart, parallel guide walls for receiving the second connector element, said guide walls having detent means therein cooperating with detent means on the second connector element to retain an assembled pair of connector elements in joined relation.

22. A construction toy system according to claim 21, further characterized by, (a) said connector element having a plurality of sockets, each comprised of a pair of gripping arms and a end wall, (b) the end walls of adjacent sockets being adjacent and integrally joined, (c) at least one of said sockets being arranged directly opposite to said open-sided recess, and (c) the balance of said sockets being arrayed on the same side of the plane containing said open-sided recess and said one socket, (d) whereby, when said connector element is joined with a second connector element, said second connector element having a plane containing the axes of its sockets, the sockets of the first connector element project in the plane of and/or on one side of the plane of the second connector element.

23. A construction toy system according to claim 22, further characterized by, (a) the socket of the first connector element, located directly opposite said open-sided recess, having a slotted end wall.

24. A construction toy system of the type utilizing a plurality of struts and connector elements for engaging the ends of said struts, which comprises (a) a central core defining a longitudinal axis of said connector element, (b) a plurality of (n) strut-receiving sockets arranged around said core about uniformly spaced radial axes and defining a plane, (c) said axes being spaced apart at 180/(n) degrees, where n is an integer between 2 and 8, (d) said sockets each comprising a pair of spaced-apart gripping arms, extending in the direction of the radial axis of said socket, and an end wall defining radially outwardly opening socket, (e) said gripping arms having inwardly extending strut-locking projections thereon, (f) said struts having annular grooves adjacent their end extremities adapted for the reception of said locking projections, (g) said gripping arms having radially oriented, concave gripping portions thereon for engagement with a strut and accommodating lateral snap-in assembly of a strut into a socket, (h) said sockets and said core defining a connector element having generally flat, spaced-apart axial end faces and forming a connector element of predetermined thickness, and of a diameter substantially greater than said predetermined thickness, (i) a pair of spaced-apart parallel guide walls extending radially outwardly from said longitudinal axis and defining an open sided recess, (j) said guide walls being spaced apart a distance substantially equal to said predetermined thickness, whereby said connector element may be joined with a second connector element to form a multiplanar assembly providing strut-receiving sockets in two right-angularly related planes.

25. A construction toy system according to claim 24, further characterized by, (a) the first connector element being configured with one socket directly opposite to said open-sided recess and all other sockets on one side of a plane containing said one socket and said recess and disposed at right angles to the plane of said first connector element.

26. A construction toy system according to claim 25, further characterized by, (a) said second connector element being configured the same as the first connector element, (b) whereby a connected pair of said connector elements define a right angle corner structure.

27. A construction toy system according to claim 25, further characterized by, (a) said second connector element being configured with sockets extending in an array of greater than 180°, (b) whereby a connected pair of said first and second connector elements define a Tee-shaped joint structure.

28. A pulley/wheel combination for use in a construction toy system, which comprises, (a) a circular wheel-like element having a rim portion and a hub portion, (b) said hub portion having an hub opening for receiving an axle-forming strut element, (c) said wheel-like element having a drive opening located a predetermined distance radially outward from the center of said hub portion, for the reception of the drive lug of a connector element mounted on an axle-forming strut element received in said hub opening, (d) said wheel-like element having an outwardly facing annular groove in said rim portion, (e) said connector element including a socket-forming section disposed on a predetermined socket axis, (f) said socket-forming section comprising a pair of spaced-apart, generally parallel cantilever mounted gripping arms symmetrically arranged with respect to said socket axis, (g) said gripping arms being formed with first interlock means to interlock with a strut element for releasably but firmly holding a strut element aligned with said socket axis, (h) second interlock means formed in said socket-forming section to interlock with a strut element for releasably but firmly holding a strut element in a predetermined axial position along said socket axis, (i) each pair of gripping arms defining between them an open-sided, axially disposed socket, and (j) said arms being resiliently separable to accommodate lateral snap-in reception of an end portion of a strut element in a direction transverse to said socket axis, whereby said strut element is firmly spaced and positioned in fixed relation to said socket-forming section, (k) said gripping arms being formed with rib-like projections extending transverse with respect to the socket axis and projecting inward toward the socket axis, (l) said strut element comprising an elongated rod-like member formed with opposite end portions and intermediate portions integrally joining said end portions, (m) said opposite end portions being provided with first and second interlocking means for cooperative engagement with the first and second interlocking means of said connector element, whereby the respective first interlocking means are adapted to hold a strut element in coaxial alignment with said socket axis and the respective second interlocking means are adapted to hold a strut element in predetermined axial position on said socket axis, (n) said strut element being formed, in a predetermined area between its ends, with opposed longitudinally extending grooves, (o) said strut element being yieldably received in said socket in an orientation disposed at 90° to the socket axis, with said rib-like projections being received in an opposed pair of said grooves, (p) whereby said strut element is non-rotatably gripped by said connector element with said strut element disposed parallel to said hub axis.

(q) said connector element being formed with an integral, laterally extending drive lug received in said drive opening, whereby said wheel-like element and said strut element are connected for rotation in unison.

29. A pulley/wheel element according to claim 28, further characterized by (a) an annular tire-like element formed of elastomeric material and removably received in said annular groove.

* * * * *